W. H. DONALD.
CLASSIFIER.
APPLICATION FILED JAN. 20, 1919.
1,298,310.
Patented Mar. 25, 1919.
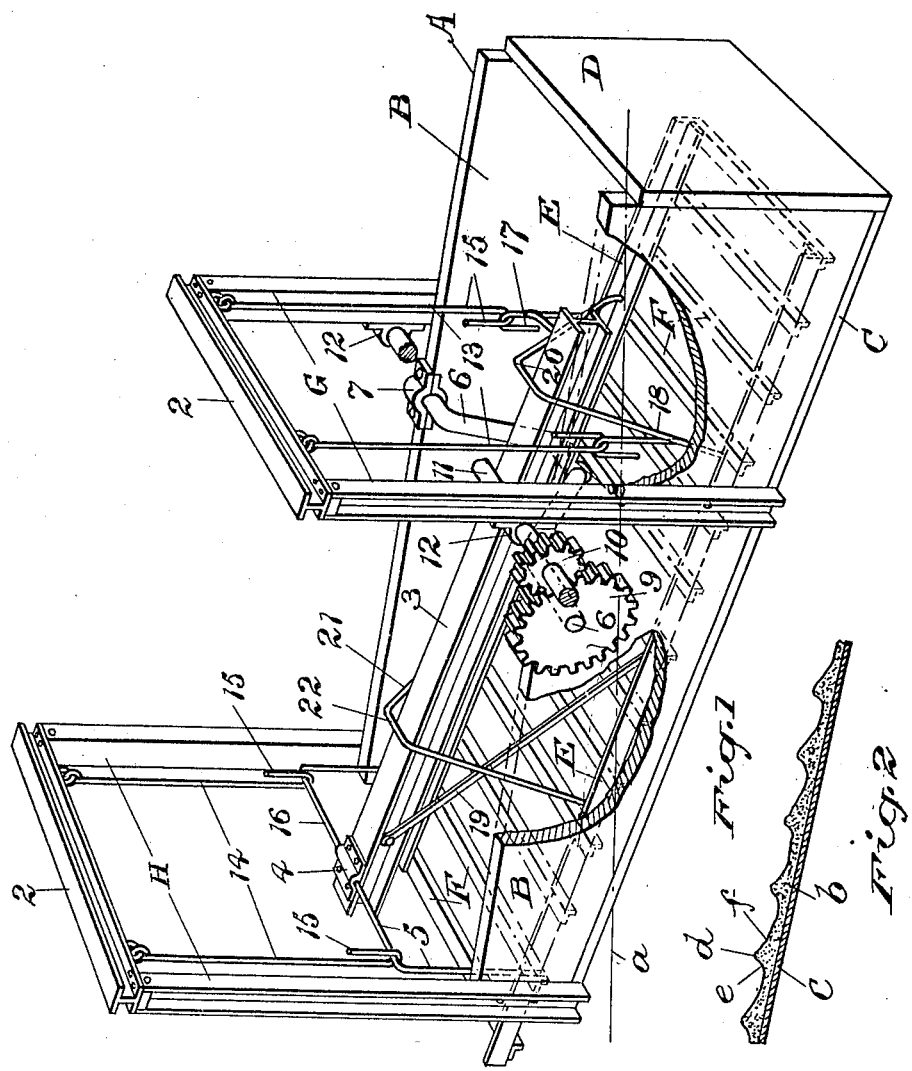

UNITED STATES PATENT OFFICE.

WILLIAM HECTOR DONALD, OF OAK RIDGES, ONTARIO, CANADA, ASSIGNOR OF ONE-HALF TO SAMUEL GUNDY FORST, OF TORONTO, ONTARIO, CANADA.

CLASSIFIER.

1,298,310.  Specification of Letters Patent.  Patented Mar. 25, 1919.

Application filed January 20, 1919. Serial No. 272,221.

*To all whom it may concern:*

Be it known that I, WILLIAM HECTOR DONALD, mechanical engineer, of the town of Oak Ridges, county of York, Province of Ontario, Dominion of Canada, have invented certain new and useful Improvements in Classifiers, for which I have obtained a patent of the Dominion of Canada numbered 186,017, dated the 13th day of August, 1918, of which the following is a specification.

My invention relates to improvements in classifiers, and the principal object of my invention is to give the teeth of the rake each a curvilinear path of movement so as to efficiently work the bed of sand to insure the maximum separation of slime therefrom before the sand escapes from the apparatus, thus increasing the efficiency of this type of apparatus; and another object of my invention is to provide a very light, yet durable, apparatus and one which can be manufactured and placed on the market at a cost considerably below that of the same class of apparatus now on the market.

Broadly considered, the classifier comprises a settling-box in the form of an inclined trough, open at the upper end; a rake; a crank-shaft journaled in the sides of said settling-box and coupled to longitudinal supporting means, which has flexible connection with said rake so that motion is transmitted from said crank-shaft to reciprocate the rake within said settling-box so as to insure each tooth of the rake having a curvilinear path of movement, and flexible means connecting said rake, near each end, with said fixed supporting means so as to suspend said rake to permit the same to be actuated, after the manner hereinafter particularly set forth, without being directly connected with said crank-shaft.

Figure 1 is a perspective view of my classifier, portion of one side of which is broken away, and Fig. 2 is a vertical longitudinal section through the bottom of the box or trough showing approximately the contour of the bed of sand as it appears when raked by the rake.

In the drawings, like characters of reference refer to the same parts.

The operation of the rake in a certain type of classifier, with which I am acquainted, agitates the sand, but since the teeth of said rake reciprocate back and forth substantially parallel to the bottom of the trough of the settling box, they do not comb or rake the bed of sand in such manner as to fully facilitate the separation of slime therefrom. Now the operation of the controlling means for my rake will comb or rake the sand into a series of ridges having more or less curved or sloped sides, by reason of the teeth being moved through individual curvilinear paths, and since each tooth overlaps the path of movement of one or both teeth at each side thereof, the formed ridges are broken down simultaneously with the formation of fresh ridges, thus insuring that the sand submerged in the water will be thoroughly agitated so as to secure the maximum separation of slime. Upon referring particularly to Fig. 2, it will be seen that the teeth of the rake are given a forward-upward movement as the rake moves toward the upper end of the settling-box, thus not only shoving the sand up toward the upper end of the box, but at the same time lifting portions thereof, thus more effectually separating the particles of sand and increasing the amount of slime recovered. The unsubmerged body of sand, by reason of the working thereof as described, is more efficiently drained so that the recovery of slime through such drainage is considerably increased, and the sand consequently considerably dried. Of course, the movement in the water will more or less break down the ridges formed in the submerged portion of the body of sand irrespective of the action of the teeth, but the action of the teeth is absolutely necessary to completely efficiently work the sand, to effect the object in view.

The settling box comprises a trough A composed of sides B, an inclined bottom C, and a closed end D, over the top of which the slime is discharged in the usual way. The rake may be of any suitable make, though it preferably comprises two side members E, which are coupled together by a plurality of teeth F, of suitable construction. G and H are pairs of posts preferably carried by the sides B, and the upper ends thereof are tied together by cross pieces 2. 3 is the suspension-bar which is hinged as shown at 4, to a bail 5, which is preferably carried by the said members E of the rake. 6 is a crank-shaft which is mounted in suitable journals 7, (only one of which is shown), carried by the sides B. As shown at 8, the said crank-shaft is held in a bearing-box 8 carried by the suspension-bar 3. The said crank-shaft is operated by any suitable means such as a toothed-wheel 9 keyed to one end thereof, with which is in mesh a pinion 10 keyed to a shaft 11 mounted in suitable bearing-boxes 12, carried by the posts G. By any suitable means such as pulleys (not shown) said shaft 11 is turned. In order to prevent the teeth of the rake from touching the bottom C of the trough, pairs of rods 13 and 14 are hinged at the upper ends of their respective cross pieces 2, and are provided with looped ends 15 which, in the case of the rods 14, engage the bar 16 of the bail 5, and in the case of the rods 13 are coupled to open hooks 17 carried by the bail 18, the lower ends of which are preferably secured to the side members E of the rake. As the crank-shaft 6 is operated, the suspension-bar is moved longitudinally of the settling-box, and in order to transmit this movement to the rake, the said suspension bar is coupled by rods 19 to the rake, preferably through said members E thereof. As before mentioned, the movement given the lower end of the suspension-bar 3 moves the suspension-bar around its hinge 4 on the bail 5, and during the upward movement of the lower end of said suspension-bar the same is brought into contact with the bar 20 of the bail 18, thus lifting the rake, which is then moved toward the lower end of the settling-box and through the further movement of the crank-shaft 6 is moved toward the upper end thereof. In order to insure the lifting of the upper end of the rake, the bail 21 is provided, and the same is coupled to the rake, as before described. At the said suspension-bar is lifted, the same is brought into contact with the bar 22 of the bail 21, and then is brought into contact with the bar 20 of the bail 18. The construction described insures the proper lifting and longitudinal movement of the rake without directly connecting the crank-shaft 6 thereto.

The bail 18, in contact with the suspension-bar 3, allows for the free downward movement of the crank-shaft 6 after it passes the horizontal, and insures that the hooks 17 are supported by the looped ends 15 by the time the said suspension-bar moves below the bar 20 of said bail, thus preventing the sudden dropping of the rake. As the suspension-bar 3 is moved downwardly around its hinge 4, through the action of the crank-shaft 6, this bar is moved below the bar 22 of the bail 21, thus permitting the bar 16 of the bail 5 to rest against the lower ends of the looped ends 15 of the rods 14, since during the lifting of the lower end of the rake, the upper end thereof is lifted, as will be understood.

The line $a$ represents approximately the position of the water-level in the trough.

In Fig. 2, $b$ represents the body of sand which covers the bottom C of the trough, and $d$ are the ridges, and $e$ and $f$ are more or less sloped sides of the ridges.

From the foregoing specification, it is clear that my classifier will operate efficiently, and since it is cheaply, yet strongly, constructed, there will be no loss of time caused through closing down thereof through breakage of the parts.

Claims:

1. In a classifier, the combination with the trough thereof; a rake mounted therein, and first and second groups of fixed supporting means associated with said trough; of a crank-shaft having bearing in said trough; reciprocating means coupled to said crank-shaft and in which the same is journaled; means flexibly coupling said reciprocating means to said rake so as to move the same longitudinally of said trough; flexible means supporting the upper end of said reciprocating means from one group of said fixed supporting means, and flexible means whereby, when said means for supporting said rake from said reciprocating means is not in operation, the rake is supported from both groups of said fixed supporting means, the whole arranged so that a complete cycle of the rake will carry the teeth thereof each through a curvilinear path of movement.

2. In a classifier, the combination with the trough thereof; a rake mounted therein, and first and second groups of fixed supporting means associated with said trough, of a suspension bar; a crank-shaft having bearings in said trough and suitably coupled to said suspension bar; means whereby said suspension bar is coupled to said rake to transmit longitudinal movement to said rake; means whereby said rake is lifted by said suspension-bar during the upward movement thereof independently of said crank-shaft; flexible means whereby, when the means for supporting said rake from said suspension-bar is not in operation, the rake is supported from both groups of said fixed supporting means, and a hinged connection for the upper end of said suspension-bar to one group of said fixed supporting means.

3. In a classifier, the combination with the trough thereof; a rake mounted therein, and first and second groups of fixed supporting means associated with said trough, of a suspension-bar; a crankshaft having bearings in said trough and suitably coupled to said suspension-bar; means whereby said suspension-bar is coupled to said rake to transmit longitudinal movement to said rake; a pair of bails spaced apart and coupled to said rake and extending over said suspension-bar so that said rake will be lifted by said suspension-bar during the upward movement thereof independently of said crank-shaft; a third bail coupled to said rake near its upper end; means whereby the upper end of said suspension bar is hinged to said third bail; a pair of rods hinged at their upper ends to said first group of fixed supporting means, and provided at their lower ends each with a loop which co-acts with said third bail; a pair of rods hinged at their upper ends to said second group of fixed supporting means; a pair of open hooks carried by the bail positioned near the lower end of said rake, and a loop formed at the lower end of each of the said second-mentioned rods co-acting with said open hooks, for the purpose specified.

Signed at Toronto, this 13th day of January, 1919.

W. H. DONALD.

In the presence of—
 A. A. ADAMS,
 P. S. MARCH.

Copies of this patent may be obtained for five cents each, by addressing the "Commissioner of Patents, Washington, D. C."